(12) United States Patent
Seregin et al.

(10) Patent No.: US 11,546,623 B2
(45) Date of Patent: Jan. 3, 2023

(54) CODED VIDEO SEQUENCE START ACCESS UNIT IN VIDEO CODING

(71) Applicant: QUALCOMM Incorporated, San Diego, CA (US)

(72) Inventors: Vadim Seregin, San Diego, CA (US); Yong He, San Diego, CA (US); Muhammed Zeyd Coban, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/196,444

(22) Filed: Mar. 9, 2021

(65) Prior Publication Data

US 2021/0289219 A1 Sep. 16, 2021

Related U.S. Application Data

(60) Provisional application No. 63/009,230, filed on Apr. 13, 2020, provisional application No. 63/004,241, filed on Apr. 2, 2020, provisional application No. 62/987,765, filed on Mar. 10, 2020.

(51) Int. Cl.
*H04N 19/44* (2014.01)
*H04N 19/187* (2014.01)

(52) U.S. Cl.
CPC ........... *H04N 19/44* (2014.11); *H04N 19/187* (2014.11)

(58) Field of Classification Search
None
See application file for complete search history.

(56) References Cited

U.S. PATENT DOCUMENTS

2017/0134742 A1* 5/2017 Deshpande .......... H04N 19/184

FOREIGN PATENT DOCUMENTS

WO 2013067687 A1 5/2013

OTHER PUBLICATIONS

Tech G., et al., "MV-HEVC Draft Text 8", 8. JCT-3V Meeting, Mar. 29, 2014-Apr. 4, 2014, Valencia, ES (The Joint Collaborative Team on 3D Video Coding Extension Development of ISO/IEC JTC1/SC29/WG11 and ITU-T SG.16), JCT3V-H1002-v5, Jun. 3, 2014, JCT3V-H1002 Version 5, (Jun. 3, 2014), 163 pages, XP030132292 (Year: 2014).*

(Continued)

*Primary Examiner* — Stuart D Bennett

(57) ABSTRACT

A video decoder may be configured to output layers of video data according to layers specified in an output layer set mode as well as based on the actual layers received in an access unit. Accordingly, the video coder may be configured to output layers actually received rather than restart a video bitstream in situations where the layers actually received do not match the layers specified in the output layer set mode. In another example, a video encoder may disable inter prediction when the sub-picture ID of a sub-picture in a currently coded picture does not match the sub-picture ID of a sub-picture in a reference picture.

10 Claims, 8 Drawing Sheets

(56) References Cited

OTHER PUBLICATIONS

Hannuksela (Nokia) M.M., et al., "AHG8/AHG12: Subpicture-Specific Reference Picture Resampling", 16, JVET Meeting, Oct. 1, 2019-Oct. 11, 2019, Geneva, CH (The Joint Video Exploration Team of ISO/IEC JTC1/SC29/WG11 and ITU-T SG.16), No. JVET-P0403, Sep. 25, 2019 (Sep. 25, 2019), 2 Pages, XP030217207, Retrieved from the Internet: URL: http://phenix.int-evry.fr/jvet/doc_end_user/documents/16_Geneva/wg11/JVET-P0403-v1.zip JVET-P0403.docx [retrieved on Oct. 3, 2019].
He (QUALCOMM) Y., et al., "AHG9/AHG12: On Subpicture ID Mapping Signalling", 130. MPEG Meeting, Apr. 20, 2020-Apr. 24, 2020, Alpbach, (Motion Picture Expert Group or ISO/IEC JTC1/SC29/WG11), No. m53242, JVET-R0265, Apr. 11, 2020 (Apr. 11, 2020), 6 Pages, XP030286324, Retrieved from the Internet: URL: http://phenix.int-evry.fr/mpeg/doc_end_user/documents/130_Alpbach/wg11/m53242-JVET-R0265-v2-JVET-R0265.zip, JVET-R0265/JVET-R0265-v2.docx, [retrieved on Apr. 11, 2020].
International Search Report and Written Opinion—PCT/US2021/021720—ISA/EPO—dated Aug. 24, 2021.
Naser (Interdigital) K., et al., "AhG 9: on ALF, LMCS and Scaling List Parameters Signalling", 130. MPEG Meeting, Apr. 20, 2020-Apr. 24, 2020, Alpbach, (Motion Picture Expert Group or ISO/IEC JTC1/SC29/WG11), No. m53156, JVET-R0180, Apr. 3, 2020 (Apr. 3, 2020), 4 Pages, XP030286124, Retrieved from the Internet: URL: http://phenix.int-svry.fr/mpeg/doc_end_user/documents/130_Alpbach/wg11/m53156-JVET-R0180-v1-JVET-R0180.zip, JVET-R0180.docx, [retrieved on Apr. 3, 2020].
Partial International Search Report—PCT/US2021/021720—ISA/EPO—dated Jun. 7, 2021.
Samuelsson (Sharplabs) V., et al., "AHG9: Coded Picture NAL Unit", 17. JVET Meeting, Jan. 7, 2020-Jan. 17, 2020, Brussels, (The Joint Video Exploration Team of ISO/IEC JTC1/SC29/WG11 and ITU-T SG.16), No. JVET-Q0255, m51850, Dec. 31, 2019 (Dec. 31, 2019), pp. 1-8, XP030222994, Retrieved from the Internet: URL: http://phenix.int-evry.fr/jvet/doc_end_user/documents/17_Brussels/wg11/JVET-Q0255-v1.zip, JVET-Q025S.docx [retrieved on Dec. 31, 2019].
Seregin (Qualcomm) V., et al., "AHG8: on CVSS AU," 130. MPEG Meeting; Apr. 15, 2020-Apr. 24, 2020, Alpbach, (Motion Picture Expert Group or ISO/IEC JTC1/SC29/WG11), No. m53251, JVET-R0274, Apr. 4, 2020 (Apr. 4, 2020), XP030286342, 4 pages, Retrieved from the Internet: URL:http://phenix.int-evry.fr/mpeg/doc_end_user/documents/130_Alpbach/wg11/m53251-JVET-R0274-v1-JVET-R0274.zip, JVET-R0274.docx [retrieved on Apr. 4, 2020].
Seregin (Qualcomm) V., et al., "AHG9: Aps Signalled in Picture Header", 130. MPEG Meeting, Apr. 20, 2020-Apr. 24, 2020, Alpbach, (Motion Picture Expert Group or ISO/IEC JTC1/WG11), No. m53250, JVET-R0273, Apr. 4, 2020 (Apr. 4, 2020), 4 Pages, XP030286341, Retrieved from the Internet: URL: http://phenix.int-evry.fr/mpeg/doc_end_user/documents/130_Alpbach/wg11/m53250-JVET-R0273-v1-JVET-R0273.zip, JVET-R0273.docx [retrieved on Apr. 4, 2020].
Suehring K., et al., "Non-CE5/AHG17: Low-Delay ALF Syntax", 16. JVET Meeting, Oct. 1, 2019-Oct. 11, 2019, Geneva, CH (The Joint Video Exploration Team of ISO/IEC JTC1/SC29/WG11 and ITU-T SG.16), No. JVET-P0452, m50420, Oct. 7, 2019 (Oct. 7, 2019), 13 Pages, XP030217352, Retrieved from the Internet: URL: http://phenix.int-evry.fr/jvet/doc_end_user/documents/16_Geneva/wg11/JVET-P0452-v2.zip, JVET-P0452-v2.docx, [retrieved on Oct. 7, 2019].
Tech G., et al., "MV-HEVC Draft Text 8", 8. JCT-3V Meeting, Mar. 29, 2014-Apr. 4, 2014, Valencia, ES (The Joint Collaborative Team on 3D Video Coding Extension Development of ISO/IEC JTC1/SC29/WG11 and ITU-T SG.16), URL: http://phenix.int-evry.fr/jct3v/, JCT3V-H1002-v5, Jun. 3, 2014, JCT3V-H1002 Version 5, (Jun. 3, 2014), 163 Pages, XP030132292.
Bross B., et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7-17, 2020, JVET-Q2001-vD, 514 Pages.
Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.
ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.
Seregin V., et al., "AHG8: on CVSS AU", JVET-R0274-v2, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-4.
Seregin V., et al., "AHG9: on IRAP NAL Constraint for Reordered Sub-Pictures", JVET-R0276, Joint Video Experts Team (JVET) of ITU-T SG 16 WP 3 and ISO/IEC JTC 1/SC 29/WG 11, 18th Meeting: by Teleconference, Apr. 15-24, 2020, 1 Page.

* cited by examiner

CODED VIDEO SEQUENCE START ACCESS UNIT IN VIDEO CODING

This application claims the benefit of U.S. Provisional Application No. 62/987,765, filed Mar. 10, 2020, U.S. Provisional Application No. 63/004,241, filed Apr. 2, 2020, and U.S. Provisional Application No. 63/009,230, filed Apr. 13, 2020, the entire content of each of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding video data. In one example, this disclosure describes techniques for outputting layers of video data in accordance with an output layer set mode. More particularly, a video decoder may be configured to output layers of video data according to layers specified in an output layer set mode as well as based on the actual layers received in an access unit. In this way, video decoder 300 may be configured to output layers actually received rather than restart a video bitstream in situations where the layers actually received do not match the layers specified in the output layer set mode. As such, delays in video output may be reduced and the user experience may be improved.

In another example, this disclosure describes techniques for encoding video data when sub-pictures are used. In particular, this disclosure describes techniques for handling prediction decisions when sub-pictures have been reordered from one picture to the next. In one example, rather than requiring a picture that has reordered sub-pictures to be coded using only intra-prediction, a video encoder may be configured to still use inter prediction for such pictures, but may disable inter prediction when the sub-picture ID of a sub-picture in a currently coded picture does not match the sub-picture ID of a sub-picture in a reference picture. In this way, inter prediction may be avoided for specific sub-pictures that have been reordered without requiring intra prediction to be used for the entire picture. As such, coding efficiency may be increased.

In one example of the disclosure, a method of decoding video data includes receiving an indication of an output layer set mode, wherein the output layer set mode specifies layer IDs of layers to be output, receiving one or more layers of video data, wherein the received one or more layers are less than all of the layers specified by the output layer set mode, and outputting at least one layer of the received one or more layers according to the output layer set mode based on the specified layers to be output and the received one or more layers.

In another example, this disclosure describes an apparatus configured to decode video data, the apparatus comprising a memory configured to store one or more layers of video data, and one or more processors implemented in circuitry and in communication with the memory, the one or more processors configured to receive an indication of an output layer set mode, wherein the output layer set mode specifies layer IDs of layers to be output, receive one or more layers of video data, wherein the received one or more layers are less than all of the layers specified by the output layer set mode, and output at least one layer of the received one or more layers according to the output layer set mode based on the specified layers to be output and the received one or more layers In another example, this disclosure describes a device configured to decode video data, the device comprising means for receiving an indication of an output layer set mode, wherein the output layer set mode specifies layer IDs of layers to be output, means for receiving one or more layers of video data, wherein the received one or more layers are less than all of the layers specified by the output layer set mode, and means for outputting at least one layer of the received one or more layers according to the output layer set mode based on the specified layers to be output and the received one or more layers In another example, this disclosure describes a non-transitory computer-readable storage medium storing instructions that, when executed, cause one or more processors of a device configured to decode video data to receive an indication of an output layer set mode, wherein the output layer set mode specifies layer IDs of layers to be output, receive one or more layers of video data, wherein the received one or more layers are less than all of the layers specified by the output layer set mode, and output at least one layer of the received one or more layers according to the output layer set mode based on the specified layers to be output and the received one or more layers.

In another example, this disclosure describes a method of encoding video data that comprises determining whether a first sub-picture ID of a first sub-picture in a current picture is different than a second sub-picture ID of a corresponding sub-picture in a reference picture, determining available coding modes based on the determination of whether the first sub-picture ID of the first sub-picture in the current picture is different than the second sub-picture ID of a corresponding sub-picture in the reference picture, and encoding the first sub-picture with one or more of the available coding modes.

In another example, this disclosure describes an apparatus configured to encode video data, the apparatus comprising a memory configured to store one or more layers of video data, and one or more processors implemented in circuitry and in communication with the memory, the one or more processors configured to determine whether a first sub-picture ID of a first sub-picture in the current picture is different than a second sub-picture ID of a corresponding sub-picture in a reference picture, determine available coding modes based on the determination of whether the first sub-picture ID of the first sub-picture in the current picture is different than the second sub-picture ID of a corresponding sub-picture in the reference picture, and encode the first sub-picture with one or more of the available coding modes.

In another example, this disclosure describes a device configured to encode video data, the device comprising means for determining whether a first sub-picture ID of a first sub-picture in a current picture is different than a second sub-picture ID of a corresponding sub-picture in a reference picture, means for determining available coding modes based on the determination of whether the first sub-picture ID of the first sub-picture in the current picture is different than the second sub-picture ID of a corresponding sub-picture in the reference picture, and means for encoding the first sub-picture with one or more of the available coding modes.

In another example, this disclosure describes a non-transitory computer-readable storage medium storing instructions that, when executed, cause one or more processors of a device configured to encode video data to determine whether a first sub-picture ID of a first sub-picture in the current picture is different than a second sub-picture ID of a corresponding sub-picture in a reference picture, determine available coding modes based on the determination of whether the first sub-picture ID of the first sub-picture in the current picture is different than the second sub-picture ID of a corresponding sub-picture in the reference picture, and encode the first sub-picture with one or more of the available coding modes.

The details of one or more examples are set forth in the accompanying drawings and the description below. Other features, objects, and advantages will be apparent from the description, drawings, and claims.

DETAILED DESCRIPTION

In general, this disclosure describes techniques for coding video data. In one example, this disclosure describes techniques for outputting layers of video data in accordance with an output layer set mode. More particularly, a video decoder may be configured to output layers of video data according to layers specified in an output layer set mode as well as based on the actual layers received in an access unit. In this way, video decoder 300 may be configured to output layers actually received rather than restart a video bitstream in situations where the layers actually received do not match the layers specified in the output layer set mode. As such, delays in video output may be reduced and the user experience may be improved.

In another example, this disclosure describes techniques for encoding video data when sub-pictures are used. In particular, this disclosure describes techniques for handling prediction decisions when sub-pictures have been reordered from one picture to the next. In one example, rather than requiring a picture that has reordered sub-pictures to be coded using only intra-prediction, a video encoder may be configured to still use inter prediction for such pictures, but may disable inter prediction when the sub-picture ID of a sub-picture in a currently coded picture does not match the sub-picture ID of a sub-picture in a reference picture. In this way, inter prediction may be avoided for specific sub-pictures that have been reordered without requiring intra prediction to be used for the entire picture. As such, coding efficiency may be increased.

Figure 1:
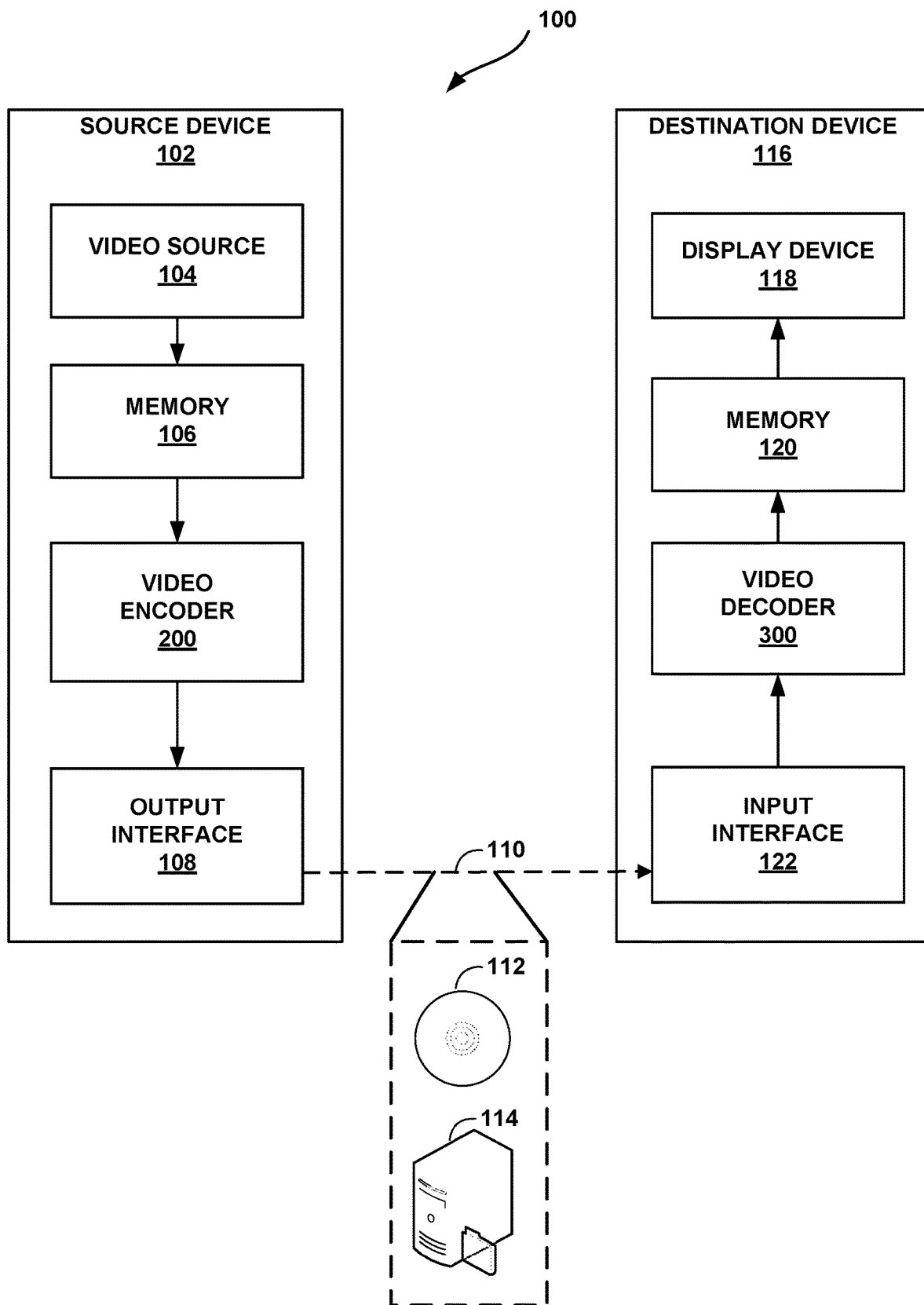
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding video data. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for coding video data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-vD (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video decoder 300 may receive one or more layers of video data, and output a layer of the one or more layers according to an output layer set mode, wherein the output layer set mode outputs the layer having the highest layer id that has been received. In one example, video decoder 300 may be configured to receive an indication of an output layer set mode, wherein the output layer set mode specifies layer IDs of layers to be output, receive one or more layers of video data, wherein the received one or more layers are less than all of the layers specified by the output layer set mode, and output at least one layer of the received one or more layers according to the output layer set mode based on the specified layers to be output and the received one or more layers.

In another example, video decoder 300 may receive one or more layers of video data, and output all layers of the one or more layers according to an output layer set mode, wherein the output layer set mode outputs all layers that are present in the received one or more layers.

In another example, video encoder 200 and video decoder 300 may set a picture output flag to zero in the case that a nuh_layer_id of a current picture is not equal to a nuh_layer_id of an output layer specified in an output layer set.

In another example, video encoder 200 and video decoder 300 may code an adaptive parameter set in one or more of a picture header or a slice header, and code video data in accordance with information in the adaptive parameter set.

In another example video encoder 200 and video decoder 300 apply a constraint for reordering sub-pictures for a current picture in the case that a previously decoded picture has reordered sub-pictures and the previously decoded picture is used as a reference picture by the current picture, and code the current picture in accordance with the constraint. For example, video encoder 200 may be configured to determine whether a first sub-picture ID of a first sub-picture in the current picture is different than a second sub-picture ID of a corresponding sub-picture in a reference picture, determine available coding modes based on the determination of whether the first sub-picture ID of the first sub-picture in the current picture is different than the second sub-picture ID of a corresponding sub-picture in the reference picture, and encode the first sub-picture with one or more of the available coding modes.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
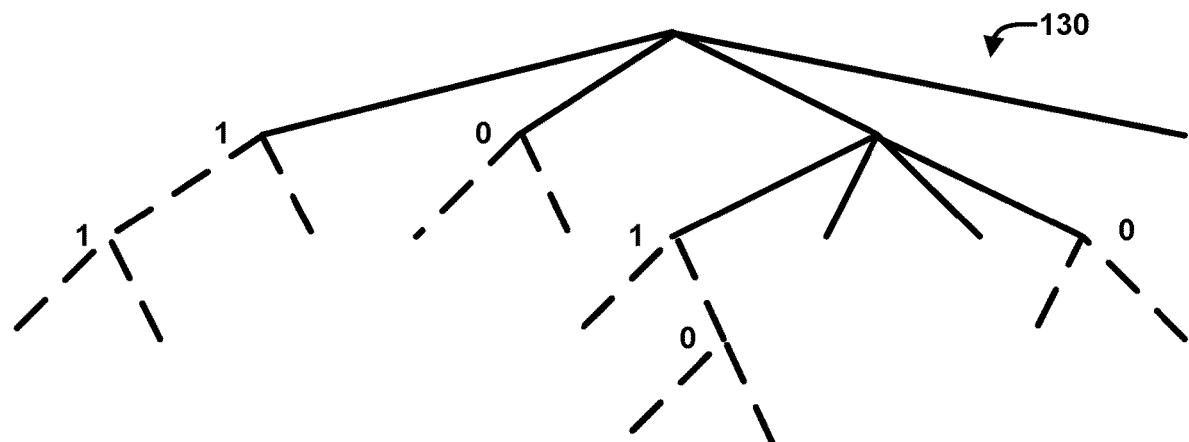
FIGS. 2A and 2B are conceptual diagrams illustrating an example quadtree binary tree (QTBT) structure, and a corresponding coding tree unit (CTU).
Figure 2B:
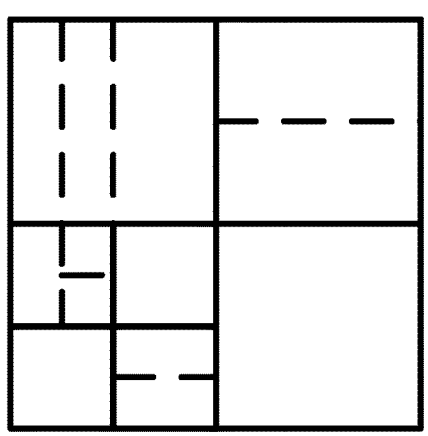

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. The binary tree node having a width equal to MinBTSize (4, in this example) implies that no further vertical splitting is permitted. Similarly, a binary tree node having a height equal to MinBTSize implies that no further horizontal splitting is permitted for that binary tree node. As noted above, leaf nodes of the binary tree are referred to as CUs, and are further processed according to prediction and transform without further partitioning.

Figure 3:
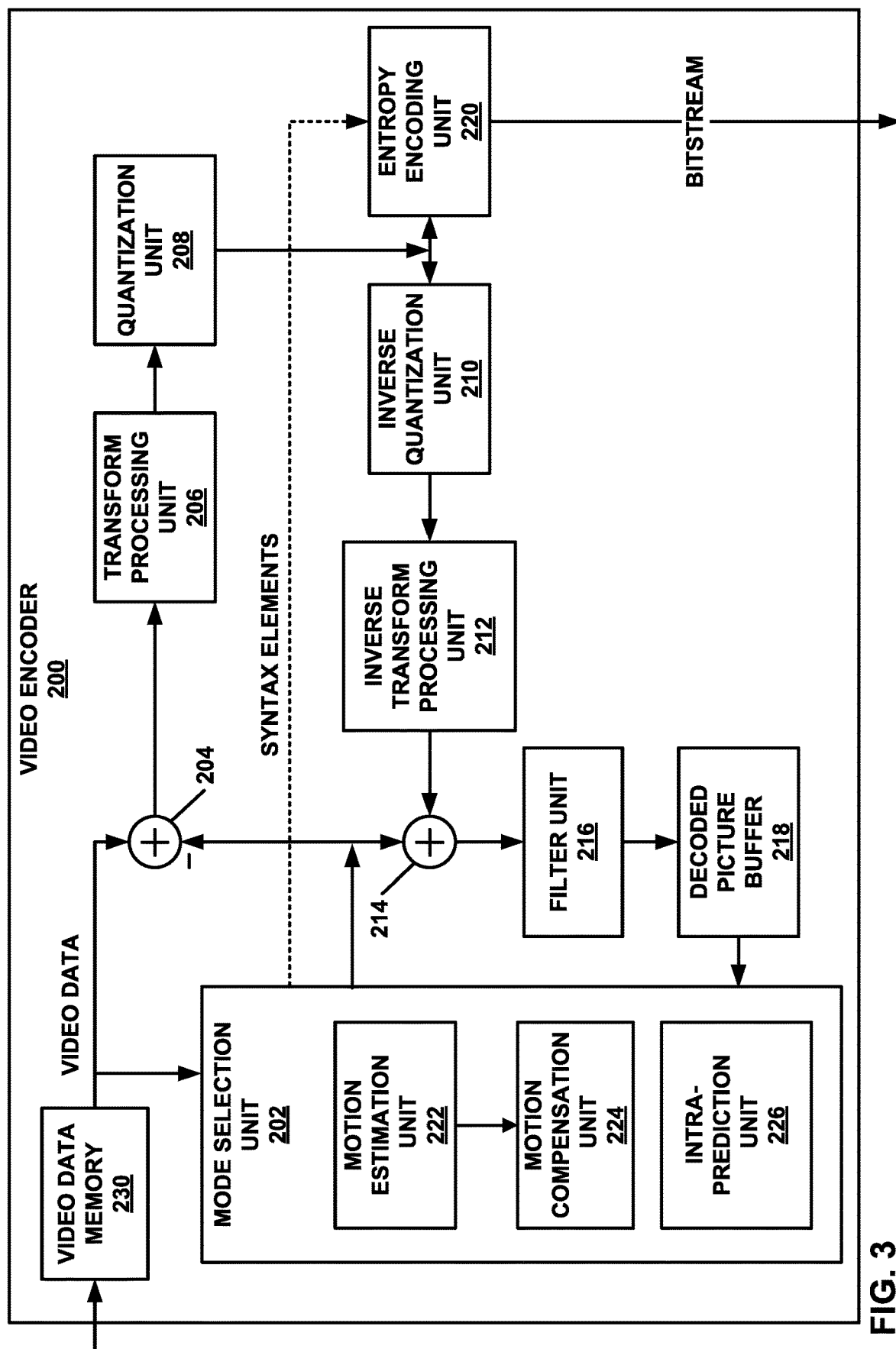
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to code an adaptive parameter set in one or more of a picture header or a slice header, and code video data in accordance with information in the adaptive parameter set.

In another example video encoder 200 apply a constraint for reordering sub-pictures for a current picture in the case that a previously decoded picture has reordered sub-pictures and the previously decoded picture is used as a reference picture by the current picture, and code the current picture in accordance with the constraint. As will be explained in more detail below, video encoder 200 may be configured to determine whether a first sub-picture ID of a first sub-picture in the current picture is different than a second sub-picture ID of a corresponding sub-picture in a reference picture, determine available coding modes based on the determination of whether the first sub-picture ID of the first sub-picture in the current picture is different than the second sub-picture ID of a corresponding sub-picture in the reference picture, and encode the first sub-picture with one or more of the available coding modes.

Figure 4:
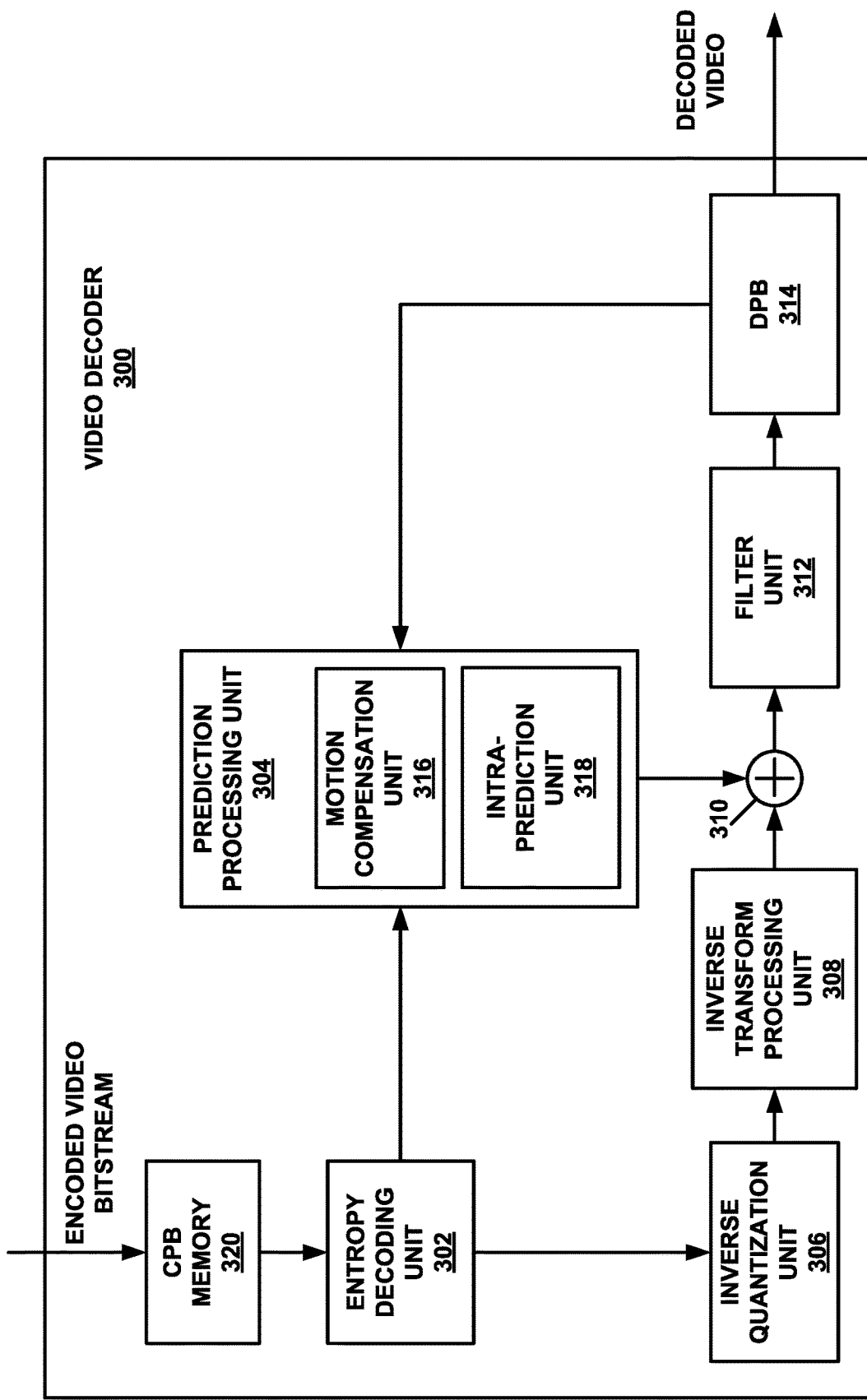
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

As will be explained in more detail below, video decoder 300 represents an example of a video decoding device including a memory configured to store video data, and one or more processing units implemented in circuitry and configured to receive one or more layers of video data, and output a layer of the one or more layers according to an output layer set mode, wherein the output layer set mode outputs the layer having the highest layer id that has been received. In another example, video decoder 300 may be configured to receive an indication of an output layer set mode, wherein the output layer set mode specifies layer IDs of layers to be output, receive one or more layers of video data, wherein the received one or more layers are less than all of the layers specified by the output layer set mode, and output at least one layer of the received one or more layers according to the output layer set mode based on the specified layers to be output and the received one or more layers.

In another example, video decoder 300 may receive one or more layers of video data, and output all layers of the one or more layers according to an output layer set mode, wherein the output layer set mode outputs all layers that are present in the received one or more layers.

In another example, video decoder 300 may set a picture output flag to zero in the case that a nuh_layer_id of a current picture is not equal to a nuh_layer_id of an output layer specified in an output layer set.

In another example, video decoder 300 may code an adaptive parameter set in one or more of a picture header or a slice header, and code video data in accordance with information in the adaptive parameter set.

In another example video decoder 300 apply a constraint for reordering sub-pictures for a current picture in the case that a previously decoded picture has reordered sub-pictures and the previously decoded picture is used as a reference picture by the current picture, and code the current picture in accordance with the constraint.

VVC Draft 8 includes the following definitions, including a definition for a coded video sequence start (CVSS) access unit (AU). A CVSS AU is a first AU in a bitstream.

coded video sequence (CVS): A sequence of AUs that consists, in decoding order, of a CVSS AU, followed by zero or more AUs that are not CVSS AUs, including all subsequent AUs up to but not including any subsequent AU that is a CVSS AU.

coded video sequence start (CVSS) AU: An AU in which there is a PU for each layer in the CVS and the coded picture in each PU is a CLVSS picture.

7.4.2.4.2 Order of AUs and their association to CVSs

A bitstream consists of one or more CVSs.

A CVS consists of one or more AUs. The order of PUs and their association to AUs are described in clause 7.4.2.4.3

The first AU of a CVS is a CVSS AU, wherein each present PU is a CLVSS PU, which is either an TRAP PU with NoOutputBeforeRecoveryFlag equal to 1 or a GDR PU with NoOutputBeforeRecoveryFlag equal to 1.

Each CVSS AU shall have a PU for each of the layers present in the CVS.

It is a requirement of bitstream conformance that, when present, the next AU after an AU that contains an EOS NAL unit shall be a CVSS AU.

VVC Draft 8 also includes the following definitions:

access unit (AU)—A set of PUs that belong to different layers and contain coded pictures associated with the same time for output from the DPB.

picture unit (PU)—A set of NAL units that are associated with each other according to a specified classification rule, are consecutive in decoding order, and contain exactly one coded picture.

coded layer video sequence start (CLVSS) PU—A PU in which the coded picture is a CLVSS picture.

intra random access point (IRAP)—An AU in which there is a PU for each layer in the CVS and the coded picture in each PU is an IRAP picture.

IRAP PU—A PU in which the coded picture is an IRAP picture.

gradual decoding refresh (GDR) PU—A PU in which the coded picture is a GDR picture.

end of sequence (EOS)

video coding layer (VCL) network abstraction layer (NAL) unit—A collective term for coded slice NAL units and the subset of NAL units that have reserved values of nal_unit_type that are classified as VCL NAL units in this Specification.

VVC Draft 8 also specifies a constraint that there should be present at least one VLC NAL (e.g., slice) of each layer included into an output layer set:

There is at least one VCL NAL unit with nuh_layer_id equal to each of the nuh_layer_id values in LayerIdInOls[opOlsIdx] in BitstreamToDecode.

The output layer set (OLS) mode (i.e., which layers are output) is defined by ols_mode_idc signaled in the VPS:

ols_mode_idc equal to 0 specifies that the total number of OLSs specified by the VPS is equal to vps_max_layers_minus1+1, the i-th OLS includes the layers with layer indices from 0 to i, inclusive, and for each OLS only the highest layer in the OLS is output.

In this context, the "highest layer" is the layer having the highest layer id value.

ols_mode_idc equal to 1 specifies that the total number of OLSs specified by the VPS is equal to vps_max_layers_minus1+1, the i-th OLS includes the layers with layer indices from 0 to i, inclusive, and for each OLS all layers in the OLS are output.

ols_mode_idc equal to 2 specifies that the total number of OLSs specified by the VPS is explicitly signalled and for each OLS the output layers are explicitly signalled and other layers are the layers that are direct or indirect reference layers of the output layers of the OLS.

The value of ols_mode_idc shall be in the range of 0 to 2, inclusive. The value 3 of ols_mode_idc is reserved for future use by ITU-T ISO/IEC.

When vps_all_independent_layers_flag is equal to 1 and each_layer_is_an_ols_flag is equal to 0, the value of ols_mode_idc is inferred to be equal to 2.

In VVC Draft 8, the decoding process starts from sub-bitstream extraction where video decoder 300 is configured to remove the NAL units of layers not included in the OLS identified by an OLS index. Since this process is specified for an OLS index, when the OLS index changes, video decoder 300 should be configured to reinitiate the sub-bitstream extraction process, which means that the first AU shall be a CVSS AU containing a PU for each of the layers present in the CVS. This means that the picture in the lowest layer (e.g., the base layer) shall be coded using only intra slices.

When OLS mode specifies to output only the highest layer or when all layers included in the OLS are output (e.g., based on the value of ols_mode_idc), based on the current constraint in VVC Draft 8 that the first picture (CVSS AU) shall contain VCL NALs (slices) of all layers, video decoder 300 outputs only the highest layer specified in the OLS or all layers specified in OLS. However, in some coding scenarios, the highest layer may not be present in an AU or not all layers specified in the OLS are present in an AU.

For example, in a video conferencing scenario where bandwidth is low, a client (e.g., video decoder 300) may receive only the base layer (e.g., lower quality) pictures. When bandwidth increases, the client may start receiving a base layer and one or more enhancement layer(s) pictures (e.g., better quality pictures) without using a CVSS AU. For example, base layer coding may continue with enhancement layer(s) VCL NAL units added using only inter-layer prediction. However, the constraints in VVC Draft 8 prohibit such a coding scenario, as the OLS index needs to be changed to specify other output layers. Changing the OLS index, and thus the OLS mode, restarts the bitstream. For example, video encoder 200 may be configured to signal an I-picture for the base layer, which causes extra overhead.

In another example, for some coding scenarios when all layers are output, the layers may have a different frame rate, meaning that some AUs may not have pictures of all layers present. However, based on the current definition in VVC Draft 8, the i-th OLS includes the layers with layer indices from 0 to i, inclusive, and for each OLS all layers in the OLS are output. However, not all layers may be present in an AU.

This disclosure describes various techniques that address the aforementioned problems. The techniques of this disclosure can be used independently or in any combination. The example implementations of this disclosure are described below relative to VVC Draft 8. Additions to VVC Draft 8 are shown between the tags <ADD> and </ADD>. Deletions from VVC Draft 8 are shown between the tags <DEL> and </DEL>.

In one example of the disclosure, it is proposed to modify the OLS mode definition such that video decoder 300 may be configured to output only the present layers in an AU, and not to require having all layers to be present in the CVSS AU. For example, when only the highest layer in output mode is utilized, instead of outputting the highest layer specified in the OLSs indicated in the VPS, video decoder 300 may be configured to output only the highest layer actually present in a particular AU.

In one example, video decoder 300 may receive a bitstream of video data that includes a plurality of AUs. Video decoder 300 may receive and decode a syntax element (e.g., ols_mode_idc) associated with the bitstream of video data, where the syntax element indicates the OLS mode for the bitstream. The syntax element (e.g., ols_mode_idc) may be received and decoded from a VPS. Video decoder 300 may be configured to operate according to the OLS mode indicated by the syntax element for AUs associated with the VPS in which the syntax element was received.

In one example, the syntax element (e.g., ols_mode_idc) indicates that the OLS mode specifies that the highest layer specified in the OLS is to be output. In this example, video decoder 300 may be configured to output the highest layer actually received in an AU of the bitstream, rather than being restricted to only outputting the highest layer specified in the OLS. That is, in some situations, the highest layer actually received in an AU may not match the highest layer specified in the OLS.

In more detail, assume that there are two layers (layer0 and layer1) included in the OLS and the highest layer is output (e.g., layer1). VVC Draft 8 requires video decoder 300 to always output layer1. In accordance with the techniques of this disclosure, video decoder 300 may be configured to output only the highest layer present in an AU. If the AU only includes layer0, then video decoder 300 is configured to decode and output layer0. If another AU has both layer0 and layer1, video decoder 300 is configured to decode and output layer1.

Accordingly, in one example of the disclosure, video decoder 300 may be configured to receive one or more layers of video data, and output a layer of the one or more layers according to an output layer set mode, wherein the output layer set mode outputs the layer having the highest layer id that is present in the received one or more layers. In other words, video decoder 300 may be configured to receive an indication of an output layer set mode, wherein the output layer set mode specifies layer IDs of layers to be output, receive one or more layers of video data, wherein the received one or more layers are less than all of the layers specified by the output layer set mode, and output at least one layer of the received one or more layers according to the output layer set mode based on the specified layers to be output and the received one or more layers.

In a more specific example, video decoder 300 may receive the one or more layers of video data in video coding layer (VCL) network abstraction layer (NAL) units (e.g., slices), wherein the received one or more layers are less than all of the layers specified by the output layer set mode. In one example, video decoder 300 may receive less than all VCL NAL units (e.g., slices) of the layers specified in the output layer set. Rather than restarting the bitstream, video decoder 300 will output the layers actually received in accordance with the output layer set mode. For example, the output layer set mode may specify that a particular layer is to be output (e.g., the highest layer in the output layer let). If the actual highest layer specified in the output layer set mode is not received, video decoder 300 will output the highest layer that is actually received. Likewise, if the output layer set mode specifies that all layers in the output layer set are to be output, video decoder 300 will output all layers actually received, even if less than all of the layers specified in the output layer set are not actually received.

In a further example, to receive the one or more layers of video data, video decoder 300 is configured to receive one or more layers of video data in an access unit. In addition, to output the at least one layer of the one or more layers, video decoder 300 is configured to output the at least one layer of the received one or more layers according to the output layer set mode based on specified layer IDs of layers to be output and the actually received one or more layers in the access unit. In one example, the output layer set mode specifies the highest layer is to be output. In this example, to output the at least one layer of the one or more layers, video decoder 300 is configured to output the layer having the highest layer id that has been actually received in the access unit. In this way, video decoder 300 may be configured to decode and output layers according to a particular OLS mode without restarting the bitstream in situations where the number and type of output layers received in AU changes. As such, delays in video output may be reduced and the user experience may be improved.

A similar technique may be applied for the case of an OLS mode that specifies all layers are output. In accordance with the techniques of this disclosure, rather than requiring video decoder 300 to always output all layers that are specified for the OLS mode in the VPS, video decoder 300 may be configured to output all layers that are actually present in a particular AU. Accordingly, video decoder 300 may output fewer or more layers for some AUs compared to other AUs, even for the same OLS mode.

In this example, like above, video decoder 300 may receive a bitstream of video data that includes a plurality of AUs. Video decoder 300 may receive and decode a syntax element (e.g., ols_mode_idc) associated with the bitstream of video data, where the syntax element indicates the OLS mode for the bitstream. The syntax element (e.g., ols_mode_idc) may be received and decoded from a VPS. Video decoder 300 may be configured to operate according to the OLS mode indicated by the syntax element for AUs associated with the VPS in which the syntax element was received.

In this example, the syntax element (e.g., ols_mode_idc) indicates that the OLS mode specifies that all layers specified in the OLS are to be output. In this example, video decoder 300 may be configured to output all layers actually received in an AU of the bitstream, rather than being restricted to outputting all of the layers specified in the OLS.

In more detail, assume that there are three layers (layer0, layer1, and layer2) included in the OLS. In one OLS mode (e.g., ols_mode_idc equal to 1) VVC Draft 8 requires video decoder 300 to always output all of the layers specified (e.g., layer0, layer1, and layer2). In accordance with the techniques of this disclosure, video decoder 300 may be configured to output only the layers actually present in an AU. If the AU only includes layer0 and layer2, then video decoder 300 is configured to decode and output layer0 and layer2. If another AU has both layer0 and layer1, video decoder 300 is configured to decode and output layer 0 and layer1. If yet another AU, has each of layer0, layer1, and layer2, video decoder 300 is configured to decode and output layer 0, layer1, and layer2.

Accordingly, in another example of the disclosure, video decoder 300 may be configured to receive one or more layers of video data, and output all layers of the one or more layers according to an output layer set mode, wherein the output layer set mode outputs all layers that are present in the received one or more layers. For example, the output layer set mode specifies that all layers that are received are to be output. To output the at least one layer of the one or more layers, video decoder 300 is configured to output all layers that have been actually received in the access unit. Again, in accordance with the techniques of this disclosure, video decoder 300 may be configured to decode and output layers according to a particular OLS mode without restarting the bitstream in situations where the number and type of output layers received in AU changes. As such, delays in video output may be reduced and the user experience may be improved.

When the custom mode of OLS is used (e.g., ols_mode_idc=2), outputting only the present layers may not be applied and instead video decoder 300 is configured to output layers specified in the OLS, since it can be an intention to have all specified layers to be output. In some examples, the technique of outputting only the present layers in an AU may be applied.

For example, in the video conference scenario, an OLS is specified to output not the highest layer included into OLS, but the highest layer present in a particular AU. This allows a gradual switch from a base layer to enhancement layer(s) without specifying a new OLS index and avoiding the bitstream resetting or restarting a CVS. The proposed approach has an advantage in compression efficiency since I-pictures are not required in the lowest layer (base layer).

In another example, in the video coding scenario when more than one layer is specified in an OLS, video decoder 300 may be configured to start the decoding process from a CVSS AU, where only one layer, for example lowest (base) layer is present which can be output. Later in a bitstream, video decoder 300 may switch to an enhancement layer when bandwidth is increased. In another example, the very first picture (e.g., a CVSS AU) shall include at least the lowest layer specified in OLS/CVS or all independent layers included in the OLS/CVS.

Another advantage of the proposed techniques is that video encoder 200 and/or video decoder 300 are allowed to remove dependent higher layers from the bitstream without specifying another OLS for such a case. In some cases, specifying another OLS may mean rewriting a VPS, since OLSs are specified in the VPS.

In VVC Draft 8, in one example, the proposed method can be implemented as follows. Additions to VVC Draft 8 are shown between the tags <ADD> and </ADD>. Deletions from VVC Draft 8 are shown between the tags <DEL> and </DEL>.

Each CVSS AU shall have a PU for each <ADD> independent </ADD> layer present in the CVS.

Each CVSS AU shall have a PU for <ADD> the lowest nuh_layer_id layer</ADD> present in the CVS.

Additionally, the semantics of ols_mode_idc is modified as follows:

ols_mode_idc equal to 0 specifies that the total number of OLSs specified by the VPS is equal to vps_max_layers_minus1+1, the i-th OLS includes the layers with layer indices from 0 to i, inclusive, and for each OLS only the highest <ADD> present </ADD> layer in <DEL> the OLS</DEL> is output.

ols_mode_idc equal to 1 specifies that the total number of OLSs specified by the VPS is equal to vps_max_layers_minus1+1, the i-th OLS includes the layers with layer indices from 0 to i, inclusive, and for each OLS all <ADD> present</ADD> layers <DEL> in the OLS</DEL> are output.

The present layer(s) in the ols_mode_idc semantics above may mean that the present layer(s) in an AU is(are) output, or present layers in CVS, are output. Additionally, "is output" and "are output" in the above semantics may be modified to be "may be output", since it is possible to set PictureOutputFlag for the output layer to be 0, in this case other layer pictures may be output.

Additionally, the constraint requiring that there is at least one VCL NAL unit with nuh_layer_id equal to each of the nuh_layer_id values in LayerIdInOls[opOlsIdx] in BitstreamToDecode is removed.

In one example, the following language is removed form VVC Draft 8: <DEL> There is at least one VCL NAL unit with nuh_layer_id equal to each of the nuh_layer_id values in LayerIdInOls[opOlsIdx] in BitstreamToDecode. </DEL>

The above removal allows the case when only one layer is always present (e.g., the lowest layer or base layer), and the case of more than one layer included in an OLS, without requiring having other layers in the bitstream. In this case, the same OLS, for example in a mode of outputting the highest present layer, can be used, while VVC Draft 8 requires video encoder 200 to specify another OLS for such an output.

In another example, instead of removing the constraint requiring that there is at least one VCL NAL unit with nuh_layer_id equal to each of the nuh_layer_id values in LayerIdInOls[opOlsIdx] in BitstreamToDecode, the constraint is modified such that, in a bitstream to be decoded, at least one VCL NAL of each independent layer is present or at least the VCL NAL of the layers present in CVSS AU are present in the bitstream.

In one example, the modified constraint can be expressed as follows: There is at least one VCL NAL unit with nuh_layer_id equal to each of the nuh_layer_id values of independent layer in LayerIdInOls[opOlsIdx] in BitstreamToDecode.

In another example, if there is still a desire o keep the current design in VVC Draft 8, i.e., the only layers specified in an OLS as output layer can be output, the picture output flag PictureOutputFlag, which controls whether a picture is output, shall be set to 0 for all pictures of a layer which is not an output layer in the OLS.

In one example, the example above can be implemented in VVC Draft 8 as follows:

PictureOutputFlag is set as follows:

If one of the following conditions is true, PictureOutputFlag is set equal to 0:

the current picture is a RASL picture and NoOutputBeforeRecoveryFlag of the associated IRAP picture is equal to 1.

gdr_enabled_flag is equal to 1 and the current picture is a GDR picture with NoOutputBeforeRecoveryFlag equal to 1.

gdr_enabled_flag is equal to 1, the current picture is associated with a GDR picture with NoOutputBeforeRecoveryFlag equal to 1, and PicOrderCntVal of the current picture is less than RpPicOrderCntVal of the associated GDR picture.

sps_video_parameter_set_id is greater than 0, ols_mode_idc is equal to 0 and the current AU contains a picture picA that satisfies all of the following conditions:

<DEL> PicA has PictureOutputFlag equal to 1.

PicA has nuh_layer_id nuhLid greater than that of the current picture. </DEL>

<ADD> nuh_layer_id of the current picture is not equal to nuh_layer_id of the output layer specified in the OLS, i.e.

OutputLayerIdInOls[TargetOlsIdx][0] not equal to the current picture nuh_layer_id. </ADD>

PicA belongs to the output layer of the OLS (i.e., OutputLayerIdInOls[TargetOlsIdx][0] is equal to nuhLid).

sps_video_parameter_set_id is greater than 0, ols_mode_idc is equal to 2, and ols_output_layer_flag[TargetOlsIdx][GeneralLayerIdx[nuh_layer_id] ] is equal to 0.

Otherwise, PictureOutputFlag is set equal to pic_output_flag.

In yet another example, the pic_output_flag or the PictureOutputFlag shall be always set to 1 for the pictures belonging to the output layers in an OLS, or at least one picture in an AU or PU shall have pic_output_flag or PictureOutputFlag equal to 1.

To allow for incomplete CVSS AUs (e.g., not all layers specified in the OLS are present), in another example of the disclosure, video encoder 200 and video decoder 300 may be configured to code CVSS AUs using a revised definition of the CVSS AU and IRAP AU to allow for the aforementioned incomplete cases. The revised definitions are as follows, where additions to VVC Draft 8 are shown between the tags <ADD> and </ADD>. Deletions from VVC Draft 8 are shown between the tags <DEL> and </DEL>.

coded video sequence start (CVSS) AU: An AU in which <DEL> there is a PU for each layer in the CVS and </DEL> the coded picture in each <ADD> present </ADD> PU is a CLVSS picture.

intra random access point (IRAP) AU: An AU in which <DEL> there is a PU for each layer in the CVS and </DEL> the coded picture in each <ADD> present </ADD> PU is an IRAP picture.

The finalized definitions (e.g., without the tags) are shown below.

coded video sequence start (CVSS) AU: An AU in which the coded picture in each present PU is a CLVSS picture.

intra random access point (IRAP) AU: An AU in which the coded picture in each present PU is an IRAP picture.

In another example, this disclosure proposes that a layer switch from one layer to another layer, for example for output, can happen only at an access unit (AU) which has only TRAP or GDR picture units (PU) or pictures. This is to prohibit a case when the layer can start decoding from the AU which does not have lower layers as IRAP or GDR pictures. In one example, the foregoing technique can be implemented as follows: coded layer video sequence start (CLVSS) picture: A coded picture that is an IRAP picture with NoOutputBeforeRecoveryFlag equal to 1 or a GDR picture with NoOutputBeforeRecoveryFlag equal to 1.

In addition, a constraint may be added to the CLVSS definition that a CLVSS is a picture of an AU which has only IRAP or GDR PUs for all present layers.

In another example, the definition of a CLVSS PU may be expressed as follows:
coded layer video sequence start (CLVSS) PU: A PU in which the coded picture is a CLVSS picture <ADD> of IRAP AU or GDR AU</ADD>.
coded layer video sequence start (CLVSS) PU: A PU in which the coded picture is a CLVSS picture <ADD> of an AU where all PUs are IRAP PU or GDR PU<ADD>/.

In another example which may be used instead of or in addition to the techniques above, video encoder 200 and video decoder 300 may be configured to operate according to a constraint that requires that there are no other layer's VCL NAL units which are not present in the previous IRAP or GDR AUs. In one example, such a constraint is implemented as follows:
For any PU which is not CLVSS PU of an AU which has only IRAP or GDR PUS, there shall be no VLC NALs with a nuh_layer_id which is not present in the associated IRAP AU or GDR AU.

In another example, the constraint can be expressed as follows:
CLVSS PU shall be a PU in an AU which has only IRAP PUs or GDR PUs for all present layers.

Embedded APS into Picture Header or Slice Header

Another technique of this disclosure includes embedding an adaptive parameter set (APS) signaling in a picture header (PH) or a slice header (SH).

In VVC Draft 8, an APS is signaled in a separate NAL unit, which has a NAL header and byte alignment at the end of APS. If many APSs are signaled, for example at every picture, the bits needed to signal the NAL header and byte alignment may add up to a sizable overhead, thus decreasing coding efficiency.

To avoid this extra overhead, this disclosure proposes that video encoder 200 be configured to embed an APS into other existing NAL units, for example PH NAL unit or VCL NAL (slice) units. In this case, there is no extra overhead associated with the APS NAL header and ALS byte alignment.

To indicate a coding mode where the APS is embedded into a PH or an SH, video encoder 200 may be configured to signal a flag in another parameter set, such as a VPS, SPS, PPS. In other examples, video encoder 200 may signal the flag in a PH, an SH, or elsewhere. Video encoder 200 may be configured to encode and signal the flag that indicates the coding mode where an APS is embedded into a PH or an SH in more than one place, for example, in an SPS to indicate that such a mode can be used in a CVS, and then in a PH or an SH to indicate that the APS is embedded into this PH or SH.

When video decoder 300 parses an APS payload or a raw byte sequence payload (RBSP), video decoder 300 pay treat either of the payloads in the same way as an APS signaled in a separate APS NAL unit. For example, video decoder 300 may store an APS payload in an APS buffer and may replace previous APS content in the buffer with the APS content received in the embedded APS when the old APS and the received APS have the same APS parameter set id.

Since more than one APS can be signaled, when this embedded mode is used, video encoder 200 may signal a syntax element to specify the number of embedded APSs. This syntax element may be conditioned on the flag indicating that embedded APS mode is used. For example, video encoder 200 and video decoder 300 may be configured to code the syntax element specifying the number of embedded APSs when the flag indicates the embedded APS mode is enabled.

In some examples, only one APS may be embedded. In this case, there may be no need to signal the number of the embedded APSs. Other APSs may be signaled using the existing mechanism, e.g., using an APS NAL. Additionally, in other examples, only APSs of specific types can be embedded, for example ALF APS, which includes parameters for one or more sets of ALFs.

The same techniques described above may be applied to other parameter sets, for example VPS, SPS, PPS, and/or others. In this case, all parameter sets may be signaled in one NAL unit.

IRAP NAL UNIT TYPE (NUT) Constraint for Reordered Sub-Pictures

In some example of VVC, video encoder 200 may be configured to signal a sub-picture layout in an SPS. A sub-picture is a sub-region of a picture that is treated as a picture for some coding techniques (e.g., prediction). The sub-picture layout defines the size and position of the sub-pictures within a picture. In some examples, video encoder 200 may be configured to reorder sub-pictures from picture to picture, where the mapping of the sub-picture IDs to the sub-picture layout is signaled in the PPS. In this context, sub-picture reordering means that a corresponding sub-picture, i.e., sub-picture covering the same part of the picture, in a previously decoded picture and a current picture may be different, i.e., those sub-pictures have different sub-picture IDs.

The related part of the VVC Draft 8 is provided below:
When the current picture is not the first picture of the CLVS, for each value of i in the range of 0 to sps_num_subpics_minus1, inclusive, if the value of SubpicIdVal[i] is not equal to the value of SubpicIdVal[i] of the previous picture in decoding order in the same layer, the nal_unit type for all coded slice NAL units of the subpicture in the current picture with subpicture index i shall be equal to a particular value in the range of IDR_W_RADL to CRA_NUT, inclusive.

According to the above constraint, if sub-picture reordering occurs, then all slices in the current picture sub-picture shall be IRAP slices. A problem with the constraint of VVC Draft 8 is that IRAP slices are required even if the previously decoded picture also has reordered sub-pictures. As such, the previous picture may not be used as a reference picture by the current picture, and the constraint of VVC Draft 8 requires the encoder to signal the related sub-picture as an IRAP slice, i.e., not using inter prediction.

In one example of the disclosure, video encoder 200 may be configured to encode pictures having re-ordered sub-pictures according to a relaxed constraint relative to VVC Draft 8. For example, video encoder 200 may be configured to apply a constraint on prediction for certain sub-pictures only when the previously decoded picture has reordered sub-pictures and is used as a reference picture by the current picture. In another example, video encoder 200 may be configured to apply a constraint on prediction for certain sub-pictures if the previously decoded picture has reordered sub-pictures and is used as an active reference picture (i.e., the picture is included into a reference picture list) by the current picture.

In another example, instead of requiring an IRAP slice type when sub-picture reordering is used, such a requirement is replaced with disabling and/or disallowing the use of inter prediction if a reference picture has reordered sub-pictures. In one example, it is required that the slice shall have an I-slice type. If inter-layer prediction is allowed, then any slice type may be used, but only allowing intra and inter-layer prediction.

In another example, the constraint can be expressed as follows. If the corresponding sub-picture in a reference picture (e.g., active reference picture) is reordered (i.e., has a different sub-picture ID than the currently coded sub-picture), video encoder 200 may be configured to not use such a reference picture for predicting the slices of the corresponding sub-picture in the current picture.

For example, video encoder 200 may be configured to determine if a reference picture for a currently encoded sub-picture has reordered sub-pictures. If so, video encoder 200 may determine whether or not the sub-picture ID for the currently encoded sub-picture is different than the sub-picture ID for corresponding location in the reference picture. If the sub-picture ID for the currently encoded sub-picture is different than the sub-picture ID for corresponding location in the reference picture, then video encoder 200 may disable inter prediction to the reference picture. If the sub-picture ID for the currently encoded sub-picture is not different than the sub-picture ID for corresponding location in the reference picture, then video encoder 200 may enable inter prediction to the reference picture as a possible coding mode.

The above example may be implemented as a constraint in VVC, as follows:

For each value of i in the range of 0 to sps_num_sub-pics_minus1, inclusive, if the value of SubpicIdVal[i] is not equal to the value of SubpicIdVal[i] of an reference picture, such reference picture shall not be used for predicting the slice NAL units of the subpicture in the current picture with subpicture index i.

Accordingly, in one example of the disclosure, video encoder 200 may be configured to determine whether or not a first sub-picture ID of a first sub-picture in a current picture is different than a second sub-picture ID of a corresponding sub-picture in a reference picture. A corresponding sub-picture in a reference picture is a sub-picture that has the same location as the currently coded sub-picture in a current picture.

Video encoder 200 may determine available coding modes based on the determination of whether the first sub-picture ID of the first sub-picture in the current picture is different than the second sub-picture ID of a corresponding sub-picture in the reference picture. Video encoder 200 may then encode the first sub-picture with one or more of the available coding modes.

For example, video encoder 200 may be further configured to disable inter prediction to the reference picture if the second sub-picture ID of the corresponding sub-picture in the reference picture is different than the first sub-picture ID of the first sub-picture in the current picture. Instead, video encoder 200 may encode the first sub-picture using a different coding mode. Other coding modes may include intra prediction, inter prediction relative to a different reference picture (e.g., where sub-picture IDs match), or another coding mode. Video encoder 200 may be further configured to enable inter prediction to the reference picture if the second sub-picture ID of the corresponding sub-picture in the reference picture is the same as the first sub-picture ID of the first sub-picture in the current picture. This does not mean that video encoder 200 must use such a reference picture as a reference in inter prediction, just that inter prediction to that reference picture is allowed.

All of the above mentioned techniques may be used independently or in any combination.

Figure 5:
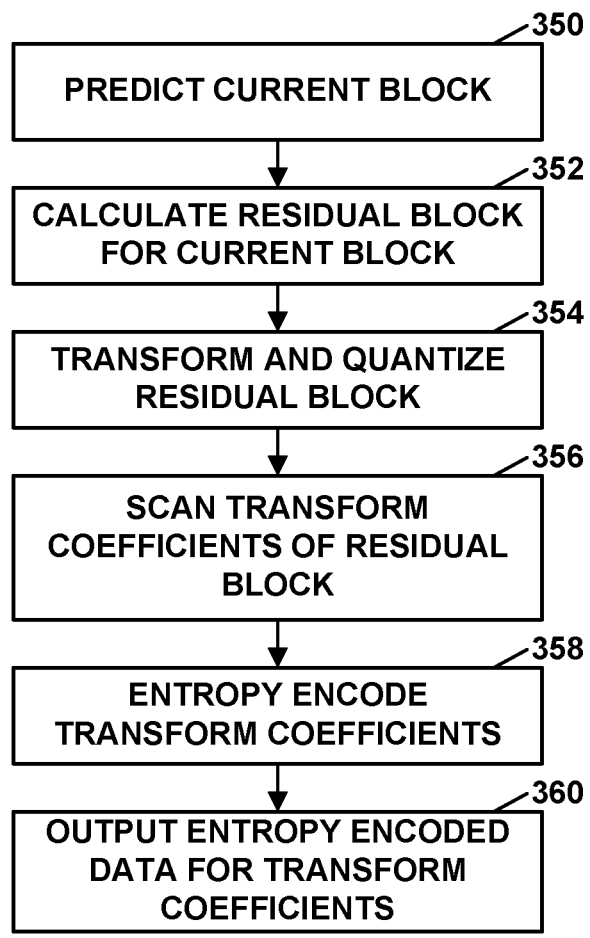
FIG. 5 is a flowchart illustrating an example video encoding method.

FIG. 5 is a flowchart illustrating an example method for encoding a current block. The current block may comprise a current CU. Although described with respect to video encoder 200 (FIGS. 1 and 3), it should be understood that other devices may be configured to perform a method similar to that of FIG. 5.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 6:
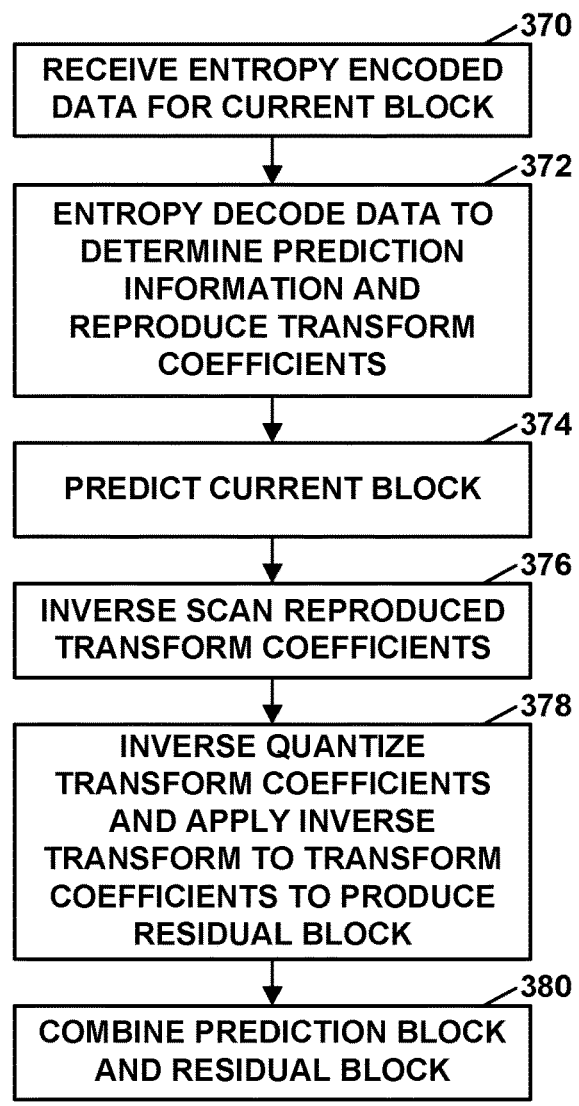
FIG. 6 is a flowchart illustrating an example video decoding method.

FIG. 6 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 6.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 7:
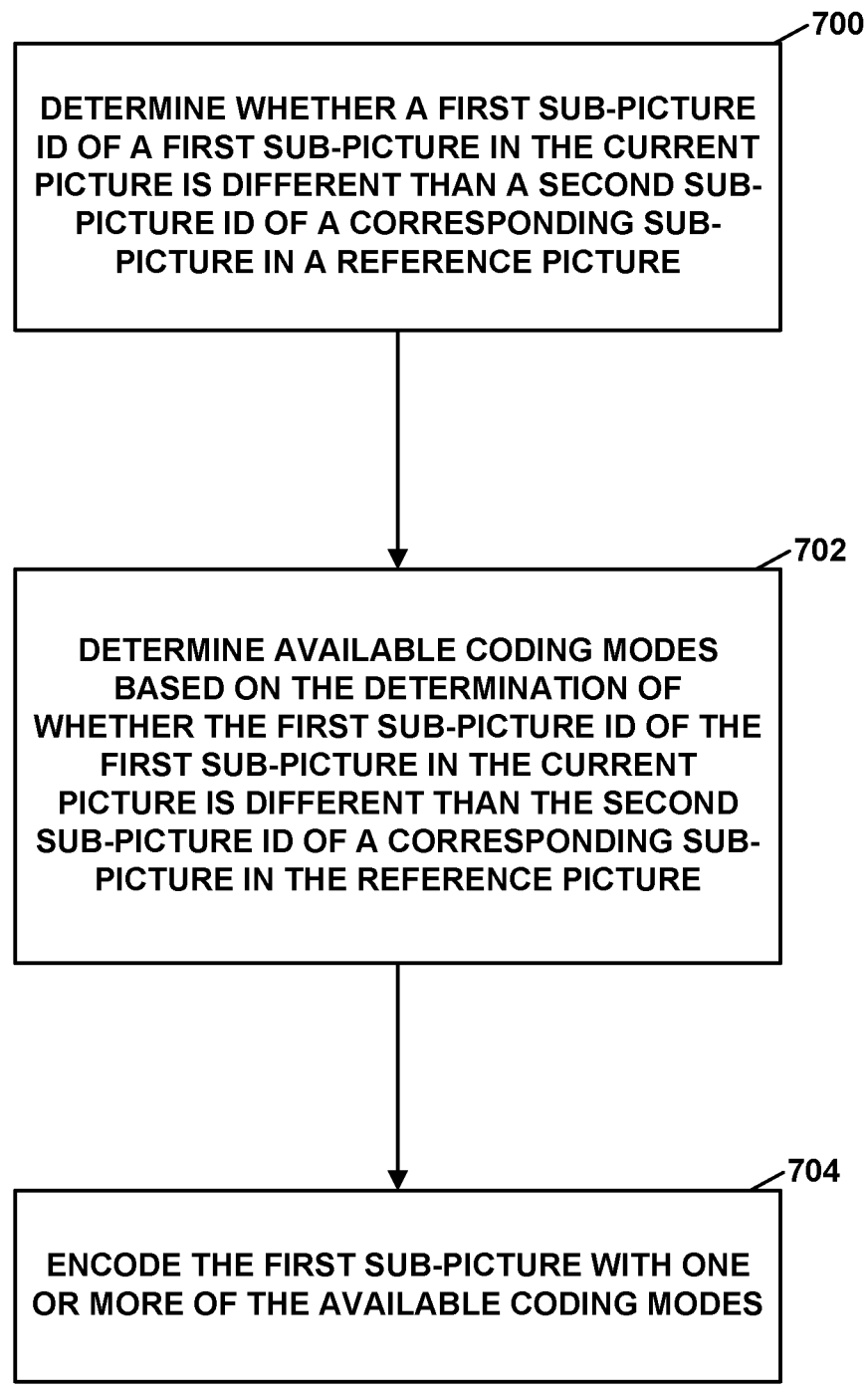
FIG. 7 is a flowchart illustrating another example video encoding method.

FIG. 7 is a flowchart illustrating another example video encoding method. The techniques of FIG. 7 may be performed by one or more structural units of video encoder 200.

In one example of the disclosure, video encoder 200 may be configured to determine whether a first sub-picture ID of a first sub-picture in the current picture is different than a second sub-picture ID of a corresponding sub-picture in a reference picture (700), and determine available coding modes based on the determination of whether the first sub-picture ID of the first sub-picture in the current picture is different than the second sub-picture ID of a corresponding sub-picture in the reference picture (702). Video encoder 200 may further encode the first sub-picture with one or more of the available coding modes (704).

In one example, to determine the available coding modes, video encoder 200 may be further configured to disable inter prediction to the reference picture if the second sub-picture ID of the corresponding sub-picture in the reference picture is different than the first sub-picture ID of the first sub-picture in the current picture. IN a further example, to encode the first sub-picture with one or more of the available coding modes, video encoder 200 may be further configured to encode the first sub-picture with a coding mode other than inter prediction to the reference picture.

In another example, to determine the available coding modes, video encoder 200 may be further configured to enable inter prediction to the reference picture if the second sub-picture ID of the corresponding sub-picture in the reference picture is not different than the first sub-picture ID of the first sub-picture in the current picture.

In one example, the corresponding sub-picture in the reference picture has the same location as the first sub-picture in the current picture.

In a further example, video encoder 200 may be further configured to encode an adaptive parameter set in one or more of a picture header or a slice header of the current picture. For example, to encode the adaptive parameter set in one or more of the picture header or the slice header of the current picture, video encoder 200 may be further configured to encode the adaptive parameter set in one or more of the picture header network abstraction layer (NAL) unit or the slice header NAL unit of the current picture. Video encoder 200 may be further configured to encode a syntax element that indicates a number of adaptive parameter sets encoded in the one or more of the picture header or the slice header.

Figure 8:
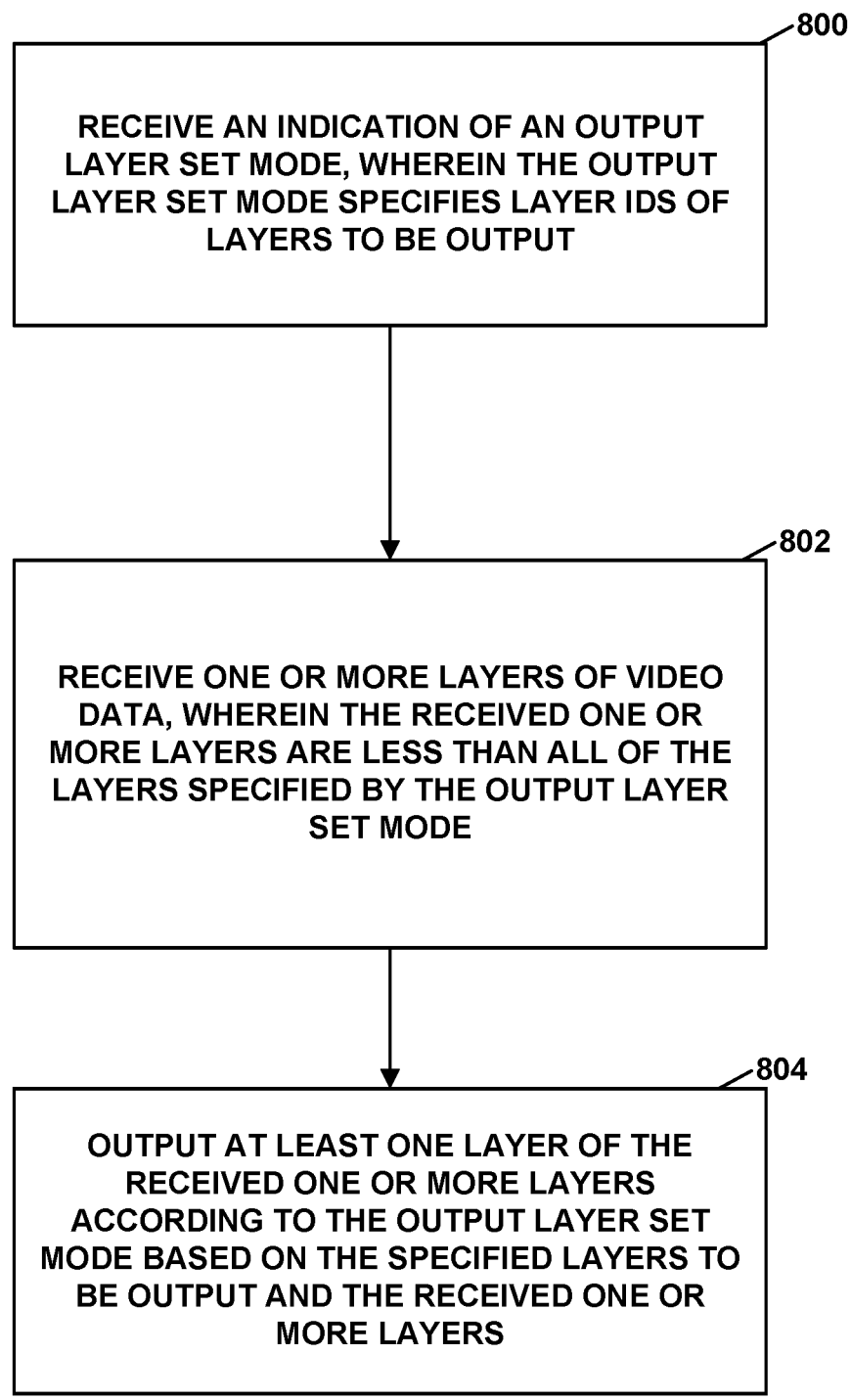
FIG. 8 is a flowchart illustrating another example video decoding method.

FIG. 8 is a flowchart illustrating another example video decoding method. The techniques of FIG. 8 may be performed by one or more structural units of video decoder 300.

In one example, video decoder 300 may be configured to receive an indication of an output layer set mode, wherein the output layer set mode specifies layer IDs of layers to be output (800), and receive one or more layers of video data, wherein the received one or more layers are less than all of the layers specified by the output layer set mode (802). Video decoder 300 may be further configured to output at least one layer of the received one or more layers according to the output layer set mode based on the specified layers to be output and the received one or more layers (804).

In a specific example, to receive the one or more layers of video data, video decoder 300 may be further configured to receive the one or more layers of video data in video coding layer (VCL) network abstraction layer (NAL) units, wherein the received one or more layers are less than all of the layers specified by the output layer set mode.

In one example, to receive the one or more layers of video data, video decoder 300 may be further configured to receive the one or more layers of video data in an access unit, and wherein to output the at least one layer of the received one or more layers, video decoder 300 may be further configured to output the at least one layer of the received one or more layers according to the output layer set mode based on the specified layers to be output and the received one or more layers in the access unit.

In another example, the output layer set mode specifies the highest layer of the specified layer IDs is to be output, and wherein to output the at least one layer of the received one or more layers, video decoder 300 may be further configured to output the layer having the highest layer ID that has been actually received in the access unit.

In a further example, the output layer set mode specifies that all layers of the specified layer IDs are to be output, and wherein to output the at least one layer of the received one or more layers, video decoder 300 may be further configured to output all layers that have been actually received in the access unit.

In another example, video decoder 300 may be further configured to set a picture output flag to zero in the case that a layer id of a current picture is not equal to a layer index specified in the output layer set mode, and output the at least one layer of the one or more layers based on the picture output flag.

Other illustrative aspects of the disclosure are described below.

Aspect 1A—A method of coding video data, the method comprising: receiving one or more layers of video data; and outputting a layer of the one or more layers according to an output layer set mode, wherein the output layer set mode outputs the layer having the highest layer id that has been received.

Aspect 2A—The method of Aspect 1A, wherein receiving the one or more layers of video data comprises receiving one or more layers of video data in an access unit.

Aspect 3A—The method of Aspect 1A, wherein receiving the one or more layers of video data comprises receiving one or more layers of video data in a coded video sequence.

Aspect 4A—A method of coding video data, the method comprising: receiving one or more layers of video data; and outputting all layers of the one or more layers according to an output layer set mode, wherein the output layer set mode outputs all layers that are present in the received one or more layers.

Aspect 5A—A method of coding video data, the method comprising: setting a picture output flag to zero in the case that a nuh_layer_id of a current picture is not equal to a nuh_layer_id of an output layer specified in an output layer set.

Aspect 6A—A method of coding video data, the method comprising: coding an adaptive parameter set in one or more of a picture header or a slice header; and coding video data in accordance with information in the adaptive parameter set.

Aspect 7A—A method of coding video data, the method comprising: applying a constraint for reordering sub-pictures for a current picture in the case that a previously decoded picture has reordered sub-pictures and the previously decoded picture is used as a reference picture by the current picture; and coding the current picture in accordance with the constraint.

Aspect 8A—A method of coding video data, the method comprising: coding a coded video sequence start (CVSS) access unit (AU), wherein not all layers are present in the CVSS AU.

Aspect 9A—A method of coding video data, the method comprising: coding a coding a coded layer video sequence start (CLVSS) picture, wherein the CLVSS picture is a coded picture that is an intra random access point (IRAP) picture or a gradual decoding refresh (GDR) picture.

Aspect 10A—The method of any combination of Aspects 1A-9A.

Aspect 11A—The method of any of Aspects 1A-10A wherein coding comprises decoding.

Aspect 12A—The method of any of Aspects 1A-10A, wherein coding comprises encoding.

Aspect 13A—A device for coding video data, the device comprising one or more means for performing the method of any of Aspects 1A-12A.

Aspect 14A—The device of Aspect 13A, wherein the one or more means comprise one or more processors implemented in circuitry.

Aspect 15A—The device of any of Aspects 13A and 14A, further comprising a memory to store the video data.

Aspect 16A—The device of any of Aspects 13A-15A, further comprising a display configured to display decoded video data.

Aspect 17A—The device of any of Aspects 13A-16A, wherein the device comprises one or more of a camera, a computer, a mobile device, a broadcast receiver device, or a set-top box.

Aspect 18A—The device of any of Aspects 13A-17A, wherein the device comprises a video decoder.

Aspect 19A—The device of any of Aspects 13A-18A, wherein the device comprises a video encoder.

Aspect 20A—A computer-readable storage medium having stored thereon instructions that, when executed, cause one or more processors to perform the method of any of Aspects 1A-12A.

Aspect 1B—A method of decoding video data, the method comprising: receiving an indication of an output layer set mode, wherein the output layer set mode specifies layer IDs of layers to be output; receiving one or more layers of video data, wherein the received one or more layers are less than all of the layers specified by the output layer set mode; and outputting at least one layer of the received one or more layers according to the output layer set mode based on the specified layers to be output and the received one or more layers.

Aspect 2B—The method of Aspect 1B, wherein receiving the one or more layers of video data comprises: receiving the one or more layers of video data in video coding layer (VCL) network abstraction layer (NAL) units, wherein the received one or more layers are less than all of the layers specified by the output layer set mode.

Aspect 3B—The method of Aspect 1B, wherein receiving the one or more layers of video data comprises receiving the one or more layers of video data in an access unit, and wherein outputting the at least one layer of the received one or more layers comprises outputting the at least one layer of the received one or more layers according to the output layer set mode based on the specified layers to be output and the received one or more layers in the access unit.

Aspect 4B—The method of Aspect 3B, wherein the output layer set mode specifies the highest layer of the specified layers IDs is to be output, and wherein outputting the at least one layer of the received one or more layers comprises outputting the layer having the highest layer ID that has been actually received in the access unit.

Aspect 5B—The method of Aspect 3B, wherein the output layer set mode specifies that all layers of the specified layer IDs are to be output, and wherein outputting the at least one layer of the one or more layers comprises outputting all layers that have been actually received in the access unit.

Aspect 6B—The method of any combination of Aspects 1B-5B, further comprising: setting a picture output flag to zero in the case that a layer id of a current picture is not equal to a layer index specified in the output layer set mode; and outputting the at least one layer of the one or more layers based on the picture output flag.

Aspect 7B—The method of any combination of Aspects 1B-6B, further comprising: displaying a picture that includes the output at least one layer of the one or more layers.

Aspect 8B—An apparatus configured to decode video data, the apparatus comprising: a memory configured to store one or more layers of video data; and one or more processors implemented in circuitry and in communication with the memory, the one or more processors configured to: receive an indication of an output layer set mode, wherein the output layer set mode specifies layer IDs of layers to be output; receive one or more layers of video data, wherein the received one or more layers are less than all of the layers specified by the output layer set mode; and output at least one layer of the received one or more layers according to the output layer set mode based on the specified layers to be output and the received one or more layers.

Aspect 9B—The apparatus of Aspect 8B, wherein to receive the one or more layers of video data, the one or more processors are further configured to: receive the one or more layers of video data in video coding layer (VCL) network abstraction layer (NAL) units, wherein the received one or more layers are less than all of the layers specified by the output layer set mode.

Aspect 10B—The apparatus of claim 8B, wherein to receive the one or more layers of video data, the one or more processors are further configured to receive the one or more layers of video data in an access unit, and wherein to output the at least one layer of the received one or more layers, the one or more processors are further configured to output the at least one layer of the received one or more layers according to the output layer set mode based on the specified layers to be output and the received one or more layers in the access unit.

Aspect 11B—The apparatus of Aspect 10B, wherein the output layer set mode specifies the highest layer of the specified layer IDs is to be output, and wherein to output the at least one layer of the received one or more layers, the one or more processors are further configured to output the layer having the highest layer ID that has been actually received in the access unit.

Aspect 12B—The apparatus of Aspect 10B, wherein the output layer set mode specifies that all layers of the specified layer IDs are to be output, and wherein to output the at least one layer of the received one or more layers, the one or more processors are further configured to output all layers that have been actually received in the access unit.

Aspect 13B—The apparatus of any combination of Aspects 8B-12B, wherein the one or more processors are further configured to: set a picture output flag to zero in the case that a layer id of a current picture is not equal to a layer index specified in the output layer set mode; and output the at least one layer of the one or more layers based on the picture output flag.

Aspect 14B—The apparatus of any combination of Aspects 8B-12B, further compmrising: a display configured to display a picture that includes the output at least one layer of the one or more layers.

Aspect 15B—A method of encoding video data, the method comprising: determining whether a first sub-picture ID of a first sub-picture in a current picture is different than a second sub-picture ID of a corresponding sub-picture in a reference picture; determining available coding modes based on the determination of whether the first sub-picture ID of the first sub-picture in the current picture is different than the second sub-picture ID of a corresponding sub-picture in the reference picture; and encoding the first sub-picture with one or more of the available coding modes.

Aspect 16B—The method of Aspect 15B, wherein determining the available coding modes comprises: disabling inter prediction to the reference picture if the second sub-picture ID of the corresponding sub-picture in the reference picture is different than the first sub-picture ID of the first sub-picture in the current picture.

Aspect 17B—The method of Aspect 16B, wherein encoding the first sub-picture with one or more of the available coding modes comprises: encoding the first sub-picture with a coding mode other than inter prediction to the reference picture.

Aspect 18B—The method of Aspect 15B, wherein determining the available coding modes comprises: enabling inter prediction to the reference picture if the second sub-picture ID of the corresponding sub-picture in the reference picture is not different than the first sub-picture ID of the first sub-picture in the current picture.

Aspect 19B—The method of any combination of Aspects 15B-18B, wherein the corresponding sub-picture in the reference picture has the same location as the first sub-picture in the current picture.

Aspect 20B—The method of any combination of Aspects 15B-19B, further comprising: encoding an adaptive parameter set in one or more of a picture header or a slice header of the current picture.

Aspect 21B—The method of Aspect 20B, wherein encoding the adaptive parameter set in one or more of the picture header or the slice header of the current picture comprises: encoding the adaptive parameter set in one or more of the picture header network abstraction layer (NAL) unit or the slice header NAL unit of the current picture.

Aspect 22B—The method of Aspect 20B, further comprising: encoding a syntax element that indicates a number of adaptive parameter sets encoded in the one or more of the picture header or the slice header.

Aspect 23B—The method of any combination of Aspects 15B-22B, further comprising: capturing the current picture with a camera.

Aspect 24B—An apparatus configured to encode video data, the apparatus comprising: a memory configured to store a current picture of video data; and one or more processors implemented in circuitry and in communication with the memory, the one or more processors configured to: determine whether a first sub-picture ID of a first sub-picture in the current picture is different than a second sub-picture ID of a corresponding sub-picture in a reference picture; determine available coding modes based on the determination of whether the first sub-picture ID of the first sub-picture in the current picture is different than the second sub-picture ID of a corresponding sub-picture in the reference picture; and encode the first sub-picture with one or more of the available coding modes.

Aspect 25B—The apparatus of Aspect 24B, wherein to determine the available coding modes, the one or more processors are further configured to: disable inter prediction to the reference picture if the second sub-picture ID of the corresponding sub-picture in the reference picture is different than the first sub-picture ID of the first sub-picture in the current picture.

Aspect 26B—The apparatus of Aspect 25B, wherein to encode the first sub-picture with one or more of the available coding modes, the one or more processors are further configured to: encode the first sub-picture with a coding mode other than inter prediction to the reference picture.

Aspect 27B—The apparatus of Aspect 24B, wherein to determine the available coding modes, the one or more processors are further configured to: enable inter prediction to the reference picture if the second sub-picture ID of the corresponding sub-picture in the reference picture is not different than the first sub-picture ID of the first sub-picture in the current picture.

Aspect 28B—The apparatus of any combination of Aspects 24B-27B, wherein the corresponding sub-picture in the reference picture has the same location as the first sub-picture in the current picture.

Aspect 29B—The apparatus of any combination of Aspects 24B-28B, wherein the one or more processors are further configured to: encode an adaptive parameter set in one or more of a picture header or a slice header of the current picture.

Aspect 30B—The apparatus of Aspect 29B, wherein to encode the adaptive parameter set in one or more of the picture header or the slice header of the current picture, the one or more processors are further configured to: encode the adaptive parameter set in one or more of the picture header network abstraction layer (NAL) unit or the slice header NAL unit of the current picture Aspect 31B—The apparatus of Aspect 29B, wherein the one or more processors are further configured to: encode a syntax element that indicates a number of adaptive parameter sets encoded in the one or more of the picture header or the slice header.

Aspect 32B—The apparatus of any combination of Aspects 24B-31B, further comprising: a camera configured to capture the current picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

receiving an indication of an output layer set mode, wherein the output layer set mode specifies layer IDs of layers to be output;

receiving one or more layers of video data, wherein the received one or more layers are less than all of the layers specified by the output layer set mode; and outputting at least one layer of the received one or more layers according to the output layer set mode based on the specified layers to be output and the received one or more layers, wherein receiving the one or more layers of video data comprises decoding the one or more layers of video data in an access unit, wherein decoding the one or more layers of video data in the access unit comprises decoding a first picture in the access unit, the first picture having at least the lowest layer ID in the specified layer IDs, and wherein outputting the at least one layer of the received one or more layers comprises outputting the at least one layer of the received one or more layers according to the output layer set mode based on the specified layers to be output and the received one or more layers in the access unit, and wherein the output layer set mode specifies the highest layer of the specified layers IDs is to be output, and wherein outputting the at least one layer of the received one or more layers comprises outputting the layer having the highest layer ID that has been actually received in the access unit.

2. The method of claim 1, wherein receiving the one or more layers of video data comprises:

receiving the one or more layers of video data in video coding layer (VCL) network abstraction layer (NAL) units, wherein the received one or more layers are less than all of the layers specified by the output layer set mode.

3. The method of claim 1, wherein the output layer set mode specifies that all layers of the specified layer IDs are to be output, and wherein outputting the at least one layer of the one or more layers comprises outputting all layers that have been actually received in the access unit.

4. The method of claim 1, further comprising:

setting a picture output flag to zero in the case that a layer id of a current picture is not equal to a layer index specified in the output layer set mode; and outputting the at least one layer of the one or more layers based on the picture output flag.

5. The method of claim 1, further comprising:

displaying a picture that includes the output at least one layer of the one or more layers.

6. An apparatus configured to decode video data, the apparatus comprising:

a memory configured to store one or more layers of video data; and one or more processors implemented in circuitry and in communication with the memory, the one or more processors configured to:

receive an indication of an output layer set mode, wherein the output layer set mode specifies layer IDs of layers to be output;

receive one or more layers of video data, wherein the received one or more layers are less than all of the layers specified by the output layer set mode; and output at least one layer of the received one or more layers according to the output layer set mode based on the specified layers to be output and the received one or more layers, wherein to receive the one or more layers of video data, the one or more processors are further configured to decode the one or more layers of video data in an access unit, wherein to decode the one or more layers of video data in the access unit, the one or more processors is configured to decode a first picture in the access unit, the first picture having at least the lowest layer ID in the specified layer IDs, and wherein to output the at least one layer of the received one or more layers, the one or more processors are further configured to output the at least one layer of the received one or more layers according to the output layer set mode based on the specified layers to be output and the received one or more layers in the access unit, wherein the output layer set mode specifies the highest layer of the specified layer IDs is to be output, and wherein to output the at least one layer of the received one or more layers, the one or more processors are further configured to output the layer having the highest layer ID that has been actually received in the access unit.

7. The apparatus of claim 6, wherein to receive the one or more layers of video data, the one or more processors are further configured to:

receive the one or more layers of video data in video coding layer (VCL) network abstraction layer (NAL) units, wherein the received one or more layers are less than all of the layers specified by the output layer set mode.

8. The apparatus of claim 6, wherein the output layer set mode specifies that all layers of the specified layer IDs are to be output, and wherein to output the at least one layer of the received one or more layers, the one or more processors are further configured to output all layers that have been actually received in the access unit.

9. The apparatus of claim 6, wherein the one or more processors are further configured to:

set a picture output flag to zero in the case that a layer id of a current picture is not equal to a layer index specified in the output layer set mode; and output the at least one layer of the one or more layers based on the picture output flag.

10. The apparatus of claim 6, further comprising:

a display configured to display a picture that includes the output at least one layer of the one or more layers.

* * * * *